US007680306B2

(12) United States Patent
Boutant et al.

(10) Patent No.: US 7,680,306 B2
(45) Date of Patent: Mar. 16, 2010

(54) METHOD FOR RECOGNITION AND TRACKING OF FIBROUS MEDIA AND APPLICATIONS OF SUCH A METHOD, PARTICULARLY IN THE COMPUTER FIELD

(75) Inventors: Yann Boutant, Aix-les-Bains (FR); David Labelle, Soucieu en Jarrest (FR); Herve Seux, Lexington, MA (US)

(73) Assignee: Signoptic Technologies, Le Bourget du Lac (FR)

( * ) Notice: Subject to any disclaimer, the term of this patent is extended or adjusted under 35 U.S.C. 154(b) by 1379 days.

(21) Appl. No.: 11/099,667

(22) Filed: Apr. 6, 2005

(65) Prior Publication Data

US 2005/0257064 A1    Nov. 17, 2005

Related U.S. Application Data

(60) Provisional application No. 60/591,582, filed on Jul. 28, 2004.

(30) Foreign Application Priority Data

May 11, 2004    (FR)    ................................. 04 05066

(51) Int. Cl.
   *G06K 9/00* (2006.01)
   *G06K 9/66* (2006.01)
   *G06K 5/00* (2006.01)
(52) U.S. Cl. ....................... 382/119; 382/108; 382/141; 382/195; 235/380
(58) Field of Classification Search ................. 382/100, 382/103, 108, 112, 115–116, 119, 141, 154, 382/195; 235/380–383
See application file for complete search history.

(56) References Cited

U.S. PATENT DOCUMENTS 1,686,585 A    10/1928    Vernam (Continued)

FOREIGN PATENT DOCUMENTS

EP    0570162    11/1993

(Continued)

OTHER PUBLICATIONS

J. Douglass, "The Vernam One-Time Pad System, and Some Technical Notes on the "Secure" Vernam Pseudorandom Keystream Generator", Copyright 1996, pp. 1-15.

*Primary Examiner*—Manav Seth
(74) *Attorney, Agent, or Firm*—Clark & Brody (57) ABSTRACT

The invention relates to a method for acceptance of a candidate fibrous medium comprising the following steps:
   a candidate digital signature is generated from a structural characteristic extracted from a reference zone of the fibrous medium, the said digital signature representing the unique, complex, chaotic structure of the reference zone, practically invariable with time;
   the candidate digital signature is compared with at least one authentic digital signature previously recorded on a digital data medium so as to issue a positive or negative decision about acceptance of the candidate fibrous medium;
characterized in that the comparison uses a statistical method to calculate a similarity index between the candidate digital characteristic and the authentic digital signature, and to compare this similarity index with a given acceptance threshold, so as to enable issuing a positive acceptance decision if the candidate digital signature does not exactly correspond to the authentic digital signature with which it is compared.

42 Claims, 3 Drawing Sheets

U.S. PATENT DOCUMENTS

| | | | |
|---|---|---|---|
| 3,636,318 A | | 1/1972 | Lindstrom et al. |
| 4,114,032 A | * | 9/1978 | Brosow et al. ............... 235/493 |
| 4,218,674 A | * | 8/1980 | Brosow et al. ............... 235/380 |
| 4,423,415 A | * | 12/1983 | Goldman .................... 235/382 |
| 4,682,794 A | * | 7/1987 | Margolin .................... 283/82 |
| 4,820,912 A | | 4/1989 | Samyn |
| 5,354,097 A | | 10/1994 | Tel |
| 5,509,692 A | * | 4/1996 | Oz ................................ 283/70 |
| 5,719,939 A | | 2/1998 | Tel |
| 5,870,469 A | | 2/1999 | Albert et al. |
| 6,135,355 A | * | 10/2000 | Han et al. .................... 235/493 |
| 6,357,656 B1 | | 3/2002 | Puff |
| 6,565,002 B1 | | 5/2003 | Tel |
| 6,584,214 B1 | | 6/2003 | Pappu et al. |
| 6,588,672 B1 | | 7/2003 | Usami |
| 2003/0138128 A1 | | 7/2003 | Rhoads |
| 2005/0026350 A1 | | 11/2005 | Boutant et al. |

FOREIGN PATENT DOCUMENTS

| | | |
|---|---|---|
| EP | 0682328 | 11/1995 |
| EP | 1139302 | 10/2001 |
| EP | 1 202 225 A2 | 5/2002 |
| FR | 2778483 | 5/1998 |
| FR | 2804783 | 8/2001 |
| FR | 2848318 | 6/2004 |
| WO | WO 03/052701 | 6/2003 |

* cited by examiner

METHOD FOR RECOGNITION AND TRACKING OF FIBROUS MEDIA AND APPLICATIONS OF SUCH A METHOD, PARTICULARLY IN THE COMPUTER FIELD

This application claims priority under 35 U.S.C. §119(e) of U.S. Provisional Patent Application No. 60/591,582 filed Jul. 28, 2004.

FIELD OF THE INVENTION

This invention relates to a method for recognition and tracking of fibrous media and applications of such a method particularly in the computer field, and more precisely for controlled access to secure information.

BACKGROUND OF THE INVENTION

Fibrous media such as paper, cardboard and non-woven materials are used daily as information media, product packaging, technical products, etc. Fibrous media thus form sensitive or valuable information media (bank notes, cheques, identity documents, etc.) and are used in sensitive environments (States, banks, etc.), others are containers of sensitive or high value products (packaging, envelopes etc.), yet others fulfil sensitive technical functions (filtration, storage, etc.).

Methods according to prior art for recognition or authentication of fibrous materials, mostly applicable to paper, usually consist of adding security elements such as physical elements (reactive or non-reactive strips, safety thread, etc.) and/or chemical substances (reagents) and particular manufacturing methods (watermarks, choice of fibres, texturisation, surface treatment, etc.). These security elements imported into/onto the original material make it more difficult to counterfeit the fibrous medium, but cannot be used to recognise each medium individually, and in particular increase the production cost of this type of material very considerably.

Patent application EP 1 202 225 proposes to use the unique physical attributes of a document, so that in a first step a key is generated associated with the document and is encoded in the form of an image itself printed on the document. The authenticity of a document is verified by generating a key in a second step under the same conditions as in the first step, that is encoded in the form of an image, and the image obtained is compared with the image printed on the document. If the image generated during the authentication is identical to the image printed on the document, it is qualified as being authentic, otherwise it is qualified as being non-authentic.

The inventors have observed that under "normal" usage conditions of the method, the document may have been slightly modified during use, for example folded, perforated, printed, etc., after the printed key has been recorded in the form of an image on the document. Furthermore, the document remains "living" during use and environmental variations (humidity, light, etc.) can make its dimensions or colour vary slightly and consequently cause slight variations to the generated key and the associated image.

Furthermore, extraction conditions of the key are difficult to reproduce exactly, for example if different acquisition or illumination equipments are used.

Consequently, this authentication method that requires an identical comparison cannot be considered to be satisfactory, considering that it systematically eliminates any document not having the same image as that obtained during the authenticity verification, without taking account of problems related to the life of the document, or the reproducibility of measurements.

BRIEF SUMMARY OF THE INVENTION

Having observed the weaknesses of techniques according to prior art existing in the document authentication field, the inventors propose to provide a general method for acceptance of a candidate fibrous medium, made of paper, cardboard or non-woven, as an authentic fibrous medium, comprising the following steps:
  generation of at least one authentic digital signature from a structural characteristic extracted from a reference zone of an authentic fibrous medium, said digital signature representing the fibrous structure of the reference zone, and recording said digital signature on a digital data medium,
  generation of a candidate digital signature from a structural characteristic extracted from a reference zone of a candidate fibrous medium, said digital signature representing the fibrous structure of said reference zone
  comparison of the candidate digital signature with at least one of the previously recorded authentic digital signatures, in order to issue a positive or negative decision about acceptance of the candidate fibrous medium.

In the method described in this invention,
  the structural characteristic of the candidate fibrous medium and the structural characteristic(s) of the authentic fibrous medium(a) are obtained scanning a volume of the medium,
  the comparison is intended to use a statistical method to determine a similarity index between the candidate digital signature and the authentic digital signature, and to compare this similarity index with a given acceptance threshold, the acceptance threshold being chosen so as to enable issuing a positive acceptance decision if the candidate digital signature does not exactly correspond to the authentic digital signature with which it is compared.

The statistical method used, notably according with the chosen acceptance threshold and/or the use of a digital processing for generating the digital signature, will allow to recognise a fibrous medium even if deliberate or accidental modifications have been made such as printing, perforation, folding, stains, etc., during its lifetime or its use.

Advantageously, the acceptance method according to the invention has one or several of the following characteristics:
  the acceptance threshold is chosen so as to enable issuing a positive acceptance decision if the candidate fibrous medium is an authentic fibrous medium which reference zone has been modified between the recording step of the authentic digital signature and the generation step of the candidate digital signature,
  the candidate fibrous medium is an authentic fibrous medium which reference zone has been modified between the recording step of the authentic digital signature and the generation step of the candidate signature, and a positive acceptance decision is issued; in particular the candidate fibrous medium is an authentic fibrous medium which reference zone has been printed, perforated, folded, cut, hand-written, plasticised, covered with a magnetic strip, surface treated, coloured, impregnated, embossed, . . . .
  the candidate digital signature is generated submitting the detected structural characteristic to a complementary digital processing in order to reduce the effect of modifications occurred in the reference zone between the recording step of the authentic digital signature and the generation step of the candidate signature, the candidate digital signature is generated submitting the digitised structural characteristic to an erosion processing and/or a filtering processing and/or a tresholding processing the reference zone of the authentic fibrous medium is a whole or part of a virgin/blank fibrous medium, or a virgin/blank part of a fibrous material, ideally a blank/virgin paper sheet the authentic digital signature and the candidate digital signature represent the unique, complex, chaotic and practically invariable with time structure of their respective reference zone from which they are extracted, the structural characteristic of the authentic fibrous medium(a) and the structural characteristic of the candidate fibrous medium considered are its internal porosity, its formation index in transvision, or the three-dimensional organization of its fibers network at a microscopic or a macroscopic scale, the digitised structural characteristic of the authentic fibrous medium(a) and the digitised structural characteristic of the candidate fibrous medium are obtained by scanning the interaction of the visible light with the fibrous medium, in transvision, the structural characteristic of the authentic fibrous medium(a) and the structural characteristic of the candidate fibrous medium considered are submitted to at least an analogue or digital processing chosen among spatial and/or frequency filters (high pass, low pass, passband, etc.) and/or Fourier Transform, and/or so-called wavelet transforms, and/or descriptors, the algorithms that can be used to analyse and/or transform and/or reorganise and/or sort and/or threshold raw data (including signals and images) extracted from the structural characteristic(s), convolution/deconvolution operations, and logical and arithmetic operation between images and/or signals; for instance, the Fourier transform of an image signal may be implemented using a Fast Fourier Transform (FFT) algorithm if the nature of the signal is discrete, or using a Fourier lens if the nature of the signal is optical, the acceptance threshold is chosen so as to enable issuing a positive acceptance decision if the fibrous medium is an authentic fibrous medium, although its digital signature does not exactly correspond to the authentic digital signature of the said authentic medium with which it is compared, due to differences in the conditions under which the digital signature is obtained, and particularly the measurement of the structural characteristic, the candidate digital signature is compared with several authentic digital signatures previously recorded in a database, the issue of a positive acceptance decision is accompanied by identification of the authentic digital signature with the best similarity index, it also includes a step to calculate and issue a confidence index for the issued acceptance decision, digital signatures are "dynamic" and are obtained from fibrous media scrolling relatively to a sensor measuring the structural characteristic.

According to another aspect of this invention, its purpose is a device adapted for implementing the acceptance method as defined above that includes:

means of extracting by transvision a structural characteristic from a reference zone on a candidate fibrous medium, representing the fibrous structure of the reference zone, including a sensor, preferably a CCD or CMOS camera means of digitising and possibly processing/coding the measured structural characteristic into a candidate digital signature, means of using a statistical method to calculate a similarity index between the candidate digital signature and an authentic digital signature previously recorded on a digital data medium, means of comparing the similarity index obtained with a given acceptance threshold so as to issue a positive acceptance decision in the case in which the digital signature does not exactly correspond to the authentic digital signature with which it is compared, means of issuing a positive or negative decision about acceptance.

The means of processing the structural characteristic may include algorithms for reducing the impact of modifications made after the generation of its authentic digital signature and its recording as an authentic medium such as printing, perforations, folding, stains, particularly means of processing such as erosion, filtering an/or thresholding.

According to another of its aspects, the invention proposes to provide new secure computer related access solutions, with a high degree of security due to the complexity and uniqueness of the fibrous medium structure and considerable reliability due to use of the statistical acceptance method described above.

Another purpose of the invention is a method for making a secure access control and issuing or rejecting an access authorisation, that uses an acceptance method defined above, an access authorisation not being given unless a positive acceptance decision has been issued.

In particular, and in the context of particular applications of the acceptance method used for secure access control methods for sensitive information, the invention provides means of comparing the candidate digital signature with several authentic digital signatures, each authentic digital signature having firstly been associated by indexing with sensitive information, and then recorded in a database, and means for accompanying the issue of a positive acceptance decision when identifying the authentic digital signature giving the best similarity index, with an access to the information associated with the said authentic digital signature.

BRIEF DESCRIPTION OF THE DRAWINGS

This invention will be better understood starting from the description given below with reference to the attached figures.

DETAILED DESCRIPTION OF THE INVENTION

One of the purposes of this invention is to provide a general method for recognition of a fibrous medium based on a statistical similarity test between a digital signature extracted from the said fibrous medium and a digital signature of an "authentic" fibrous medium previously recorded on a digital data medium, and particularly a database. The first step of the method is to scan a structural characteristic of an authentic fibrous medium, to generate an authentic digital signature from said characteristic and to record it and save it in a lasting manner. The authentic digital signature is stored on a storage unit of digital data and has not to be printed on the fibrous medium. In a same manner, several authentic digital signatures can be generated from different fibrous media and stored, advantageously, in a database. For instance, this step can be made with virgin fibrous media, before any modification. The second step is to scan, again, a structural characteristic from a candidate fibrous medium and to generate a candidate digital signature and to compare it to one or several recorded authentic digital signature(s), in order to check whether the candidate fibrous medium is recognised as authentic, in spite of its possible modifications. According to the comparison result, a positive or negative decision about acceptance of the candidate fibrous medium, as an authentic fibrous medium, is issued.

Figure 2:
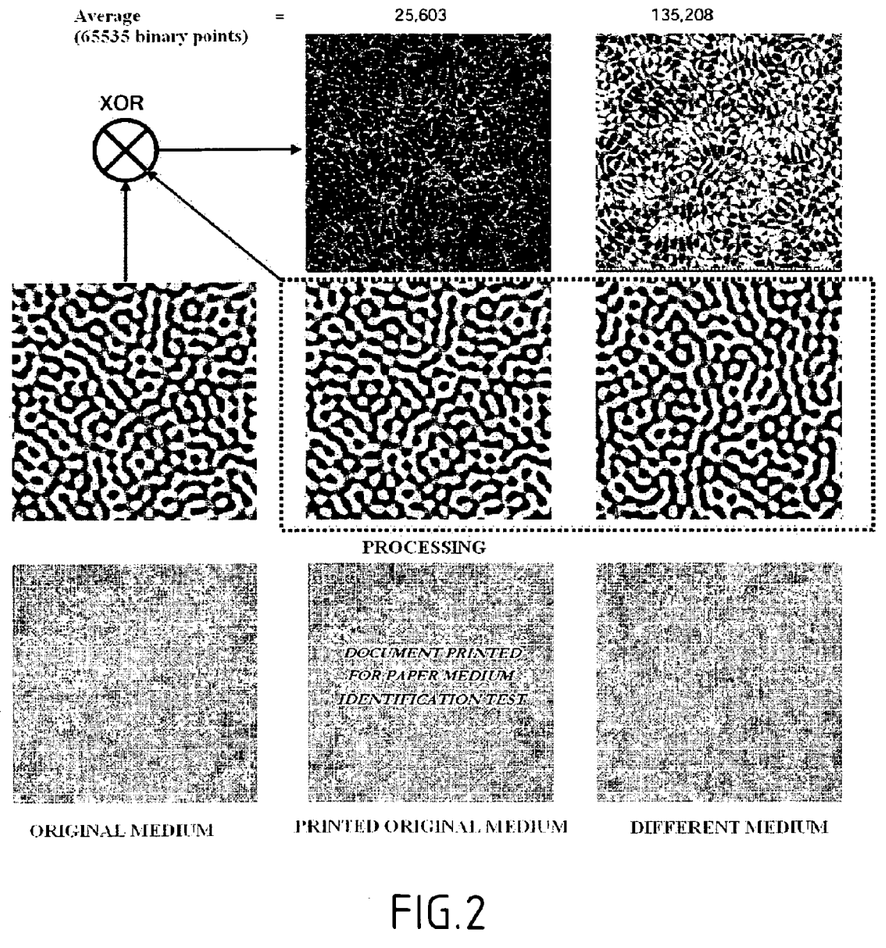
FIG. 2 shows a step in the method according to the invention and shows similarity indexes obtained by comparing a recorded authentic digital signature (of an authentic paper) with the signature obtained afterwards for the same authentic paper, for the same authentic paper modified by printing, and for a different paper.

The methods described in this invention use digital signatures obtained from at least one structural characteristic of a fibrous medium made of paper, cardboard, non-woven, chosen for its structural characteristics. As a consequence, all the methods consistent with this invention include at least one step of generating at least one digital signature from a fibrous medium made of paper, cardboard or non-woven, more precisely a step of scanning a structural characteristic of a paper material, a cardboard material or a non-woven material, in order to generate a digital signature. The fibrous medium made of paper, cardboard or non-woven used, has a unique, complex, chaotic and practically invariable with time structure. Following a standard meaning, a "digital signature" of a zone of a fibrous medium is a digital representation, a digital characterisation of the scanned zone. In this invention, a digital signature is extracted from the structure of the material constituent of the fibrous medium, it is obtained from at least one characteristic of the material representing its structure. Advantageously, the digital signature has a random nature. In particular, the digital signatures can have the form of a digital image of the structure of the material element as shown in FIG. 2.

A fibrous medium such as paper, cardboard or non-woven means a physical medium made of paper, cardboard or non-woven, this physical element possibly being in several forms: film, sheet, box, envelope, card, etc.

This invention is applicable to any type of paper, cardboard or non-woven composed of cellulose fibres, glass fibres, carbon fibres, plastic fibres, ceramic fibres, asbestos fibres, etc., possibly in combination with mineral fillers and other additives (for example binders). The usual papers and cardboards made of cellulose fibres are preferred. These fibrous media are composed of extremely complex, anisotropic and heterogeneous porous material in which the fibres may be collected in aggregates. Consequently, all these fibrous media, regardless of their type, have a unique, complex, chaotic practically invariable with time three-dimensional structure. Fibrous media are usually made in continuous strips that are typically in sheets form, although other forms also exist. Fibrous media made of paper, cardboard or non-woven include both deterministic and random characteristics. Therefore, in the scope of this invention it will be important to extract the random part as well as possible. These fibrous media will also generally be non-copiable and non-reproducible.

Authentic fibrous media according to the invention may be of any type, there is no need for them to be printed or to have been subjected to any particular transformation. The method according to the invention is applicable to existing fibrous media, that may or may not have been transformed and may or may not have been used. The fibrous medium does not need to have been made exclusively for this purpose.

Authentic fibrous media may be made from a material that has recently left the production line, or may be a blank sheet, a printed document, an envelope, a label, a flat or corrugated cardboard box, an access card, an identity card, a used bank note. Any type of paper can be used with reactive or non-reactive planchettes and/or security threads and/or physico-chemical substances (reagents) and/or watermarks and/or a particular texture and/or surface treatment and/or colouring agent and/or bleaching agent, etc. But, according to the invention, it is the fibrous structure of the fibrous medium that is essential for generating the digital signature. Authentic fibrous media may include a scrolling medium, and in this case the generated digital signature would be "dynamic" as will be described below.

The fibrous media made of paper, cardboard or non-woven, and particularly the paper media, combine a largely complex structure, a chaotic aspect at different scales, uniqueness at each location, and if they have not been subjected to excessive external aggression that could cause total destruction of their structure, they are practically invariable with time due to very slow aging under normal external conditions. Chaotic means that their fibrous structure is random, and is not reproducible nor predictable, random. Thus, by examining the structure of a reference zone of such a fibrous medium, it is possible to extract one or several characteristics representing the chaotic, complex unique and normally fairly stable structure of the scanned zone. The method according to the invention uses an extracted structural characteristic to generate one or several digital signatures, after digitisation and possibly processing/coding. Any digital signature obtained in a reference zone of a fibrous medium cannot be obtained with another fibrous medium, even in another zone of the same fibrous medium. Obviously, the reference zone from which the structural characteristic is extracted can be extended to include the entire fibrous medium.

Paper, board or non-woven is a three-dimensional medium and cannot be reduced or assimilated to a simple layer or surface. Many fundamental properties result from its thickness, such as porosity/permeability, compressibility, stiffness, . . . . The uniqueness of the structure of such material is based on the random entanglement on several layers of elementary fibres having received themselves a physico-chemical treatment prior to their use. The structure itself of this web/network is the most permanent characteristic of a paper medium, a board or a non-woven, and cannot be destroyed without destroying the medium itself. In the scope of the invention, a structural characteristic is extracted from the fibrous material, which means a characteristic that represents the chaotic internal "organization" of the material. By scanning the structure of the material, and so observing a volume of said material, we ensure the practical invariability of the extracted structural characteristic. Furthermore, the structural characteristic scanned, taking into account the material in its thickness, allows us to obtain a complex information. The extracted structural characteristic and the consequent digital signature built reflects the original nature of the fibrous medium, which means its unique, complex, chaotic and practically invariable with time structure.

The aquisition of surface characteristics of a paper, board or non-woven is not adapted practically for the applications addressed in the present invention because:

the surface/roughness of a paper, board or non-woven can be easily modified intentionnally or not, smoothing it (with one's fingernail for instance), embossing it (mechanical marking of the surface), . . . ; these modifications impede any recovering of valuable information from a candidate medium; while the volumic structure remains almost unchanged after these alterations . . . .

the printing process, perforating process, writing process, . . . alter much more the surface characteristics of the material than its volumic characteristics It is impossible in practice to plasticize a paper medium, board or non-woven and recover its initial surface characteristics, while its internal volumic structure remains accessible and unchanged; and plastisizing is a simple and reliable mean to protect and so to increase the lifetime of a fibrous material According to the invention, the detected structural characteristic is not limited to the surface properties of the reference zone, but is a characteristic representative of the three-dimensional fibrous structure on a volume, a thickness. The bulk fibrous structure of a fibrous medium can be scanned in several ways observing a volume of the fibrous medium including internal porosity, look-through in transvision, three-dimensional organization of the fibrous network at microscopic or macroscopic scale, colouring or printing revealing the internal structure of the material, optical, magnetic or physical tracer carried by the fibrous structure, that are all unique characteristics that can be extracted. It is also possible to jointly observe different properties of the fibrous medium. For instance, in the case of a security paper, it is possible to scan on the one hand the lookthrough in transvision and on the other hand particulate elements embedded in the paper.

There are different ways of measuring the structural characteristic of a fibrous medium representing its complex, unique, chaotic and practically invariable structure, and then digitising it, possibly followed by digital processing to obtain a digital signature. Usually, the characteristic is measured on a reference zone corresponding to a localised part of the fibrous medium or to the whole fibrous medium.

The structural characteristic is usually extracted with a measurement sensor which allows to obtain a representation, a characterisation of the internal organization of the fibrous medium, in a volume of said medium. For example, it is possible to use contactless methods (optical and/or electromagnetic) in which an electromagnetic wave or radiation interacts by reflection and/or absorption and/or transmission and/or diffusion and/or refraction and/or diffraction and/or interference with the fibrous medium, that use an optical/electronic sensor to make the measurement and the acquisition, and possibly the digitisation. The sensor(s) used can then be placed in any position with respect to the observed fibrous medium and with respect to the radiation source(s). Typically, the radiation used may be visible and/or infrared (IR) and/or ultraviolet (UV) light and/or laser light or beta rays and/or gamma rays and/or X rays and/or other. The choice of the radiation and the sensor(s) used may be influenced by the application of the method, the selected type of fibrous medium, the chosen measurement scale, the implementation cost, etc. The sensor(s) used may be fixed with respect to the source and/or the fibrous medium, or may be in relative movement. Advantageously, the detection/digitisation of the structural characteristic is obtained by detection of the interaction of the fibrous medium with visible light, by transmission, in particular using a sensor, preferably a CCD or CMOS camera.

It is also possible to use contact methods between the fibrous medium and the measurement sensor(s). The sensor is then of the feeler type, possibly integrating electromagnetic dimensions (magnetic behaviour) or others, in addition to the mechanical dimension. In this case, relative movement of the feeler and the fibrous medium is necessary. Another alternative is to use the fibrous medium as a medium for an ultrasonic wave or another stress (electrical, thermal, chemical, biological, etc.) and to record the behaviour, which means the response in different orientations of the fibrous medium to this wave, this applied stress.

The fibrous materials may move relative to the sensor (for example a paper reel unwinding in front of a fixed camera, or a paper disk rotating with a sensor moving in the radial direction, etc.): the structural characteristic is then measured continuously, so as to generate a "dynamic" digital signature.

The structural characteristics of the fibrous medium may be extracted at one or several scales, varying from the microscopic to the macroscopic scale, in other words from about 1 µm to several cm in general, or even other scales. The structure can be scanned by transvision, at the fibres scale/level, elements varying from about 100 µm to several mm in length, and with a width of about 10 to 20 µm for paper, or at the fibre aggregates scale/level, typically of the order of 1 to 10 mm in the case of paper. The complexity of the digital signature depends on the scale and orientations, that are therefore chosen as a function of the target application.

A structural characteristic on the fibrous medium, reflecting its unique and complex structure, may be detected by scanning a volume of the medium such that after digitisation, the digitised structural characteristic is in 1D, 2D or 3D form. The structural characteristics represent the structure of the material constituent of the reference zone of the fibrous medium. As previously mentioned, they are obtained observing internal characteristics, possibly together with surface characteristics in a volume of said fibrous medium. Detection may also be done independently of time, or "in real time". If it is done in real time, the structural characteristic is sampled in time. Similarly, dimensions can be added to this detection phase, observing the fibrous medium at different orientations or illuminations, in colour, grey shades, or in binary form. The image considered may also be real or complex image (amplitude and phase) in terms of image processing and analysis.

The digital signature(s) used in the method according to the invention correspond to such a digitised structural characteristic, possibly subjected to digital processing or coding using one or several algorithms. In a usual way, the expression digital means a representation of data or physical units in the form of all types of signals (including real or complex images, amplitude and/or phase components) with discrete values, for example in the form of figures (irrespective of the base: binary, decimal, hexadecimal . . . ) or in the form of any given set of symbols (alphabet, predefined grammar . . . ). Digital systems often use analogue to digital and digital to analogue converters. Thus, a digital signature of this type may be in binary form, or in the form of one or several colour or grey shade images, or one or several images, that may be real or complex.

The acquiring and the shaping/conditioning even digitising of one or several structural characteristics of the fibrous medium is performed thanks to one or several sensors with or without contact with the fibrous medium. These sensors are normally followed by an analogue (optical or electronic, for example) or digital (capture board wired into any given computer or automatic platform) run unit.

One or several digital signature(s) are generated from structural characteristics extracted and shaped/conditioned.

Encoding (in analogue and/or digital form) can be performed followed or preceded by digitisation if the structural characteristics extracted are not already in digital form, the nature of these processes can vary depending on the type of chosen fibrous medium and the application for which the method is implemented.

Many methods could be considered to generate one or several digital signatures from scanned structural characteristics, and it would not be reasonable to try and mention them all. Therefore the techniques mentioned below are in no way exhaustive.

Advantageously, the structural characteristics are submitted to an analogue or digital processing, so implemented after digitisation. Naturally, known methods of processing and analysing the signal or image can be used directly. Electronic or algorithmic processing then used in analogue or digital form can be based on spatial and/or frequency filters (high pass, low pass, passband, etc.) and/or Fourier Transform, and/or so-called wavelet transforms, and/or descriptors, and more generally any type of algorithm that can be used to analyse and/or transform and/or reorganise and/or sort and/or threshold raw data (including signals and images) extracted from the structural characteristic(s). Convolution/deconvolution operations, and logical and arithmetic operation between images and/or signals may be used to obtain the said signatures. As an illustration, the Fourier transform of an image signal may be implemented using a Fast Fourier Transform (FFT) algorithm if the nature of the signal is discrete, or using a Fourier lens if the nature of the signal is optical.

Regardless of the coding or processing applied to the structural characteristic, the digital signature obtained reflects the chaotic fibrous structure of the reference zone from which it was extracted. If the digitised structural characteristic is in the form of an image of grey shades obtained by a CCD camera and if it is decided to binarise the image, there is no doubt that some information will be lost and therefore the discrimination power during the acceptance decision will be reduced, but the calculation speed and access time to the different signatures will be improved. Therefore a compromise needs to be found and chosen as a function of applications of the acceptance method according to the invention. It is well understood that all the wealth of the invention is revealed using one or several digital signatures preserving the complex and random nature of the unique and practically invariable structure of the reference zone of the material, in spite of the numerical processing applied to the structural characteristics to generate the digital signature.

Figure 1:
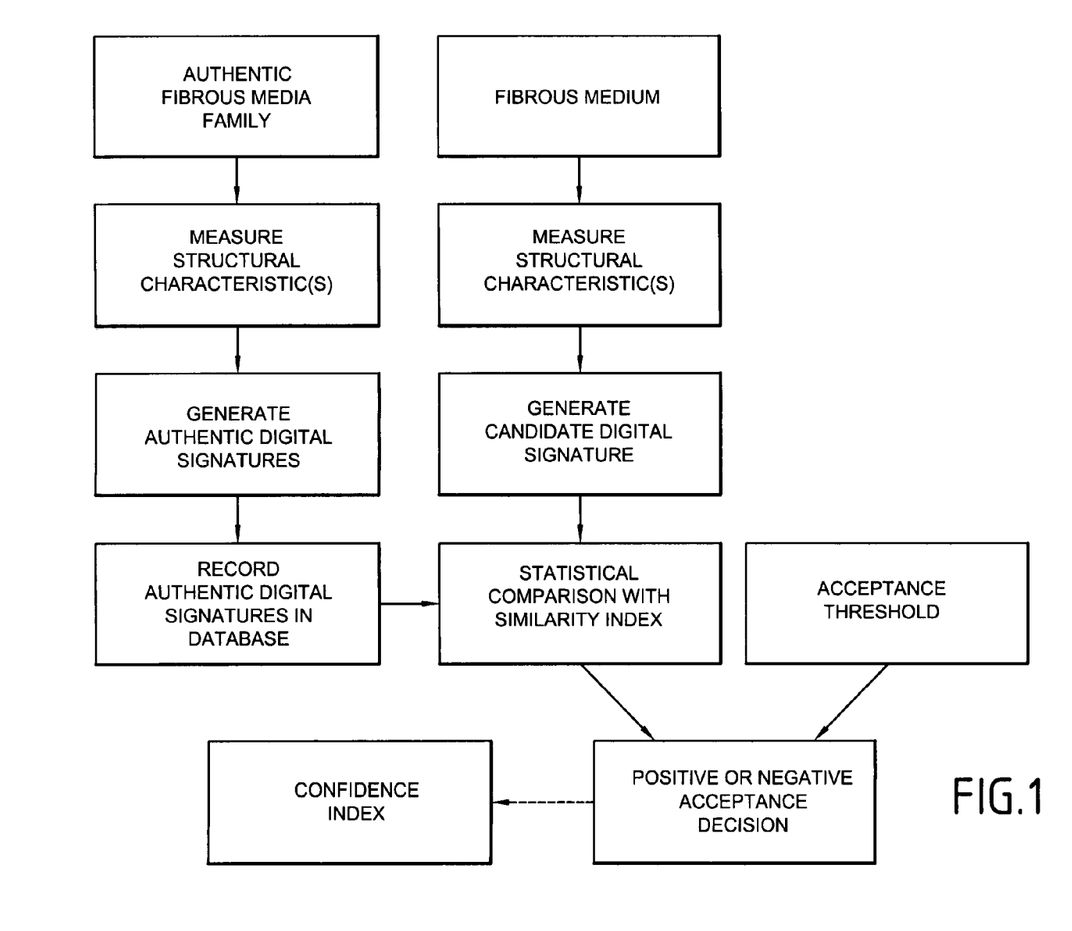
FIG. 1 shows the different steps of a variant of the method according to the invention.

Measurement of a structural characteristic of a fibrous medium and its coding/digitisation into a digital signature are implemented in the two essential phases of the method as shown in FIG. 1: firstly, during the creation of an authentic digital signature or a family of authentic digital signatures from a fibrous medium or a family of fibrous media qualified as being authentic, and then when the candidate digital signature of the candidate fibrous medium subjected to the acceptance method is obtained. Obviously, it is important that the measurement and coding methods implemented in the two phases of the method should be similar, in other words they should include the same essential steps. More precisely, considering the uniqueness of the structure, the "authentic" measurement and the subsequent measurement of the structural characteristic must be made on two reference zones that present at least a common part and are, preferably, localised on the same place of the medium: this zone may be precisely localised, for example by a delimitation or plastic protection, or may cover the entire medium. The same structural characteristic must be measured. Advantageously, the coding methods used, if any, must be the same. Nevertheless, a candidate digital signature may be obtained using complementary digital processing, designed to eliminate some modifications made to the fibrous medium, after its digital signature has been recorded as being authentic. This final point will be described in detail later.

Furthermore, it will be difficult to make measurement conditions of the structural characteristic (atmosphere, moisture content, illumination, orientation of the fibrous medium with respect to the sensors, devices used, etc.) in both phases of the method ("authentic" measurement and "candidate" measurement) identical. Furthermore, the measurement and digitisation methods used on authentic fibrous media and on candidate fibrous media may be slightly different, particularly the equipment settings may be different.

Consequently in most cases, the digital signature of a tested fibrous medium will not exactly correspond to the said authentic digital signature, even if it is exactly the same as an authentic fibrous medium that was used to generate an authentic digital signature.

Furthermore, although the fibrous media are not modified or are only slightly modified in time and in space, if some structural characteristics are measured at a given moment, it is possible to find the same characteristics either intact or very similar at a later time. Nevertheless, between the time when authentic digital signature of a fibrous medium is recorded and when it is subsequently submitted to the acceptance method, a fibrous medium may be affect by:

intentional transformations: printing by any means, perforation and microperforations by any means, cutting, folding, gluing, handwriting or drawing, plastification, coating with a magnetic track or other surface processing, colouring, impregnation by any substance including resin, complexing with other materials, embossing, etc., unintentional transformations induced by external aggression such as stains, dirt, aging, dimensional variations generally related to temperature, moisture content, tearing, folds, etc.

The result is that the digital signature of a fibrous medium obtained after these modifications will not be the same as the authentic signature of the same medium, recorded before modification.

Indeed it is possible to protect a fibrous medium from possible external aggression (scratches, perforations, optical deterioration, etc.) in order to keep it as invariable as possible. This protection may be made by inserting the fibrous medium permanently in an external envelope or a resin that in no way prevents access to its bulk, internal structural characteristics. This external envelope also contains other elements in addition to the fibrous medium itself (for example a photograph in the case of an identity card), and may intimately bond to the paper such that opening the envelope will cause destruction of all or part of the fibrous medium. The type of protection to be provided for the paper depends on the chosen application (frequent reading in the case of an access card, sensitivity of the application, etc.). Nevertheless, this plastic envelope modifies somehow the structural characteristic detected from the fibrous medium and as a consequence its digital signature.

The acceptance method described in the scope of the invention, allows to recognize an authentic fibrous medium in spite of different modifications occurred in the reference zone between the recording step of authentic digital signature of the fibrous medium and the generation step of a candidate digital signature with the same medium.

One of the essential characteristics of this invention is to make a statistical test of similarities between a digital signature of a candidate fibrous medium submitted for acceptance and a previously recorded authentic signature. The power of this method is that it can be used to decide whether or not the candidate fibrous medium can be considered to be authentic and, through the use of a confidence index, to quantify the probability of having made an error on the decision (for example, this paper is considered to be authentic with the probability of making an error equal to $1/1000000$). Therefore, it is possible to build up an initial database with any authentic fibrous media, and refer to it throughout the life of the fibrous media and/or their transformation. The database of authentic signatures may also contain any type of information, including parameter settings, thresholds, confidence index, scale used, etc. The degree of tolerance of the method according to the invention provides a mean of confirming the identity of a paper medium having been transformed after being recorded as authentic, particularly after having been printed, plastified and cut out. This statistical sensitivity also provides better tolerance to the method of extraction of the digital structural characteristic considered, and this extraction can be made using different devices at different times and at lower cost, whenever it is decided to do so.

Moreover, with the process according to the invention, the reference zone, and in particular its structure, can be modified between the generation of the authentic digital signature and the generation of the candidate digital signature. The process according to the invention may be implemented with a candidate medium which reference zone is different from the reference zone of an authentic fibrous medium which authentic digital signature was stored. Advantageously, this medium will be recognized as an authentic fibrous medium, if its reference zone presents, at least 0.1 mm$^3$, for instance a surface of around 1 mm$^2$ on a thickness of around 100 µm, common and unmodified, with the reference zone used for generating the authentic digital signature.

Various statistical methods may be used for calculating similarity indexes depending on the nature of the digital signature: for example, correlation of local image entropy, correlation of images, Hamming distance of binary images, Euclidian distances, etc. The acceptance threshold chosen as being the decision criterion will be a limiting value of the similarity index determining the limit between candidate fibrous media that will be accepted and are therefore considered as being authentic, and candidate media that will be rejected and will therefore be considered as being impostors. There are then four occurrence families as a function of this selected decision criterion:

1-Accepted as Authentic media (AA)
2-Accepted as Impostor media (IA)
3-Rejected as Authentic media (AR)
4-Rejected as impostor media (IR)

Therefore the decision criterion can be chosen so as to maximise the AA and IR quantities, and to minimise the IA and AR quantities. The decision criterion may be adjusted as a function of the degree of security required in the target application: the question that arises is to know if it is preferable to reject authentic signature media or to accept impostor media in the target application. It would also be possible to set up a quantification of the probability of occurrence of each of the AA, IA, AR and IR events, to determine a strategy for definition of the selection criterion as a function of the probability of occurrence of one or several of the above events. The acceptance threshold is chosen to allow a positive acceptance decision in cases when the candidate digital signature does not exactly matched the authentic digital signature to which it is compared. In the scope of the invention, the acceptance threshold is advantageously chosen in order to accept as authentic, fibrous media that have been used previously to generate the authentic digital signatures, and which since then have been modified, in particular printed, perforated, folded, cut out, hand-written, plasticised, covered with a magnetic strip, surface treated, coloured, impregnated, embossed, . . . .

It is also possible in the generation step of a candidate digital signature to submit the digitised structural characteristic to a numerical processing which purpose is to reduce or eliminate the impact of said modifications. In the case of a printing, an additional processing of erosion in the sense of image processing can be used. A filtering processing could be used as well in order to eliminate the text. In the case of a perforation, a filtering processing, for instance a pass-band filtering and/or a thresholding processing can be used as a numerical pre-processing. Nevertheless, after filtering, the digital signature of the printed fibrous medium will not be identical to the one obtain prior to the printing.

The acceptance threshold and the possible pre-processing are chosen following the possible transformations of the reference zone that can occur.

FIG. 2 uses a simple example to illustrate the advantage of the fibrous medium recognition method according to the invention. A method will be chosen for acquisition of the characteristic (view in transvision in daylight), and for coding (passband filter in this case) and a similarity index will be chosen (arithmetic mean of the XOR of two binary images) for making the comparisons. The image in transvision of a zone of an authentic blank sheet of paper is recorded, in digital form, on a computer. The blank paper is subsequently printed, and then becomes a document. A different blank paper is chosen. The characteristic of the printed authentic paper is acquired, a pre-processing is done to eliminate the effect of printing (erosion in terms of image processing), this sample is then coded and compared with the recorded characteristic using the chosen methods and a similarity index of 25.603 is obtained. The same characteristic acquisition and coding operations (preprocessing is unnecessary in this case since the paper is not printed) are performed with a different blank paper medium, and its characteristic is compared with the characteristic of the recorded authentic medium in a similar manner: the similarity index obtained is 135.208. If an acceptance threshold of 50 is applied, for example, it is easy to discriminate the authentic paper medium even after being transformed (similarity index less than the chosen threshold) from the different paper/impostor medium (similarity index greater than the chosen threshold).

In order to choose the acceptance threshold, the type of different signatures which have to be accepted by the comparison are selected: differences due to differences in the conditions used for generating the digital signatures and/or differences due to modifications occurred on the reference zone. The acceptance threshold will be advantageously chosen, so as to accept in at least 99% of cases, preferably in at least 99.9% of cases, preferentially in at least 99.99% of cases, the selected different digital signatures, which, despite their differences in comparison with the authentic digital signature stored, correspond to an authentic fibrous medium.

The method according to the invention can be used in any existing type of machine, for example printer, fax, photocopier, scanner, . . . capable of transmitting digital information and/or storing it and/or reproducing it. In particular, the device comprises:

means of extracting a structural characteristic for a reference zone of a candidate fibrous medium, representing the unique, complex, chaotic structure of the reference zone, practically invariable with time, and particularly a sensor, preferably a CDD or CMOS camera;

means of digitising, and possibly processing and/or coding the measured structural characteristic into a candidate digital signature which can include algorithms for reducing the impact of modifications made in the reference zone such as printing, perforations, folds, stains, etc.), means of using a statistical method to calculate a similarity index between a candidate digital signature and an authentic digital signature previously recorded on a digital data medium, means of comparing the similarity index obtained with a given acceptance threshold, so as to enable issuing a positive acceptance decision even if the digital signature does not precisely correspond to the authentic digital signature with which it is compared, means of issuing the positive or negative decision about acceptance.

The acceptance method according to the invention may be used in different applications. Obviously, it can be used to check the integrity or authenticity of documents carrying sensitive or valuable information.

The method according to the invention is particularly useful for traceability of fibrous media. In particular, it can be used to track the life of a fibrous medium, and particularly paper, from when it is selected as authentic medium to when it is used, passing through transformation steps (printing, engraving, perforation, folding, cutting, etc.). In different stage of its life, it will be possible to generate, from this fibrous medium, a candidate digital signature, in order to verify its authenticity. The method according to the invention with an acceptance threshold authorises such traceability, unlike a method based on an identical comparison. A database of blank authentic media (sheets or cards or envelopes or packaging or other) can be built. Then candidate digital signatures generated from media modified in their use for instance, can be compared to the recorded authentic digital signatures in the database.

Another application consists of physically bonding the fibrous medium to a product, an object, or even a living being, and using it as a label. Direct monitoring of the fibrous medium using the method according to the invention provides a means of indirectly monitoring the product, object or living being. The physical bond must be such that any attempt to separate the fibrous medium from the product, object or living being would cause destruction of the label, for example an irreparable tear in the case of paper bonded by an adhesive.

Other essential applications of the acceptance method according to the invention are related to the domain of secure access control methods. Additionally, the invention relates to a method for providing secure access control and for giving or not giving an access authorisation, which uses a control key constituted of a fibrous medium made of paper, cardboard or non-woven and comprising the following steps:

a characteristic of the fibrous structure of the fibrous medium is detected on a reference volume of the fibrous medium and a candidate digital signature representing the fibrous structure of the fibrous medium is generated from the said structural characteristic, this candidate digital signature is compared with a digital datum previously stored, by using a statistical method and a negative or positive decision about acceptance is issued, an authorization of access is issued if the comparison allowed the issuance of a positive decision about acceptance.

The digital datum previously stored corresponds to an authentic digital signature. All the previously described for the method of acceptance are directly applicable to this method for providing secure access control. In this method for providing secure access control, an access authorisation will only be given if a positive acceptance decision is issued. The fibrous medium may then be used directly as a physical and hardware key used to control access to premises, machines, computers, hotel rooms, information indexed to the authentic digital signature. By implementing the process of acceptance, if the physical key is accepted, an entrance authorization in a premise, a machine, a computer, an hotel room, is given to the user of the physical key. Use of the method according to the invention provides a means of obtaining a better degree of security than would be obtained with the iris of the human eye, which is the best biometric characteristic used industrially at the moment.

In applications requiring a secure access to sensitive information, an authentic signatures database is generated and an additional virtual link is created associating at least one item of sensitive information with each digital signature, using a preferably secure database. So, each digital signature is indexed to a sensitive information. In this case, a positive acceptance decision will be issued accompanied by identification of the authentic digital signature that provides the best similarity index, and access to the information associated with the said authentic digital signature. This type of secure access control method is used in applications in many fields such as occupation tracking, traceability, control and information security. With the method according to the invention, the required degree of security can be chosen as a function of the application, particularly by varying the complexity of the digital signature and the chosen acceptance threshold. For example, a "dynamic" signature can be used to enable access to information, as long as the scanned candidate material is considered to be authentic.

It is also possible that authentic digital signatures, stored in the database, are not digital signatures of different fibrous media, but are different digital signatures on the same fibrous medium to enable different access levels.

The fibrous medium acts as an access key and, among other forms, may be in the form of cards and be physically associated with an electronic chip and/or a magnetic strip. The media can, moreover, integrate the means for transmitting data or integrate one or multiple elements implemented in data transmission, in particular radio-frequency sensitive elements (active or passive antennas for instance) implemented in a contactless and distant data transmission.

Sensitive information may be structured in a different database or it may be shared with the authentic signatures database, made completely or partially secure by any known means, or not made secure at all, and contain:

information about settings of sensors and the installation for digitisation, extraction and generation of digital signatures (scale, algorithms used, etc.)

general administrative information (identity of persons, personal codes, etc.)

biometric information, information partly contained on the paper (printed or other), information on other papers (for example digital signature of an envelope, present at the same time as the letter paper signature).

Another application directly covered by this invention is the joint use of the acceptance method according to the invention with any biometric method for identifying a human being, an animal or a plant. The acceptance method according to the invention can be adapted to computer platforms developed for the comparison of biometric characteristics, particularly such as fingerprints. This joint use provides a means of solving difficult problems of identifying the bearer of a paper document (access card, identity document, etc.) including the authentic fibrous medium, together with authentication of the said document, and associating these two identifications/authentications with information about the bearer and/or his paper document.

For example, the method according to the invention could also be used to secure electronic mail, to provide remote access to information through a telecommunication network (for example Internet), to make electronic signatures.

The examples given below illustrate the invention and are not in anyway limitative.

EXAMPLE 1

An image digital signal in grey shades is extracted from a paper seen in transvision using a CCD camera, and filter algorithms (2D Gabor, Laplace, FFT passband, etc.) are applied to this signal at different spatial frequencies (scales), or along different directions. These operations are carried out to build up the family of "authentic" signatures and whenever the acceptance method is implemented on a candidate paper sample.

A comparison can then be made between images derived from these algorithms directly in grey shades or in binary form, in other words in the form of matrices of 0s and 1s. The authentic digital signatures and the candidate sample signature should preferably be the same size.

When binarisation and thresholding is used, the comparison of this digital signature A of the candidate sample with authentic digital signatures B of the same size is done by an XOR (exclusive OR) logical operation, bit by bit. A resulting image file C with the same size as the compared digital signatures is obtained. The phase to calculate the similarity index is done by calculating the arithmetic mean of the bits in image C (Hamming distance (DH)). In this case, two signatures obtained from the same paper will have a DH close to zero, two signatures obtained from two different papers will have a DH close to 0.5. An acceptance threshold will be chosen within the range ]0; 0.5[.

When the grey shades of images obtained after the coding phase are compared directly, the image correlation can be used as a method of comparison. Identical papers will have a correlation close to 1, and different papers will have a correlation close to 0 (positive or negative). An acceptance threshold within the range ]0; 1[ may be chosen as being the decision criterion, below which the compared papers will be considered to be different (impostors) and above which they will be considered to be identical (authentic).

Therefore, acceptance threshold criteria depend entirely on the coding methods and selection of a similarity index to make the comparison. Furthermore, each application will have security requirements that will determine strategies for the selection of coding methods, similarity indexes and particular acceptance thresholds.

A double test was carried out on different sheets of paper extracted from the same production (parent reel), by scanning the look-through in transvision of samples. Firstly, the digital signatures characteristic of all the different samples were compared and, after firstly selecting a relevant similarity index, it was possible to build up a distribution of the number of samples as a function of their similarity index (for example correlation). The next step was to select a given sample that was measured a large number of times, consequently inducing operational measurement errors, and the same similarity index was used to build up a distribution of the number of measurements as a function of their similarity index.

The distribution curves were then shown graphically. The abscissa axis corresponds to the similarity factor between the tested signatures, and the ordinate axis corresponds to the number of images at a given level of the similarity index.

If the three distribution curves obtained are plotted on the same graph, it is clear that the method according to the invention is capable of discriminating two different types of paper.

Figure 3:
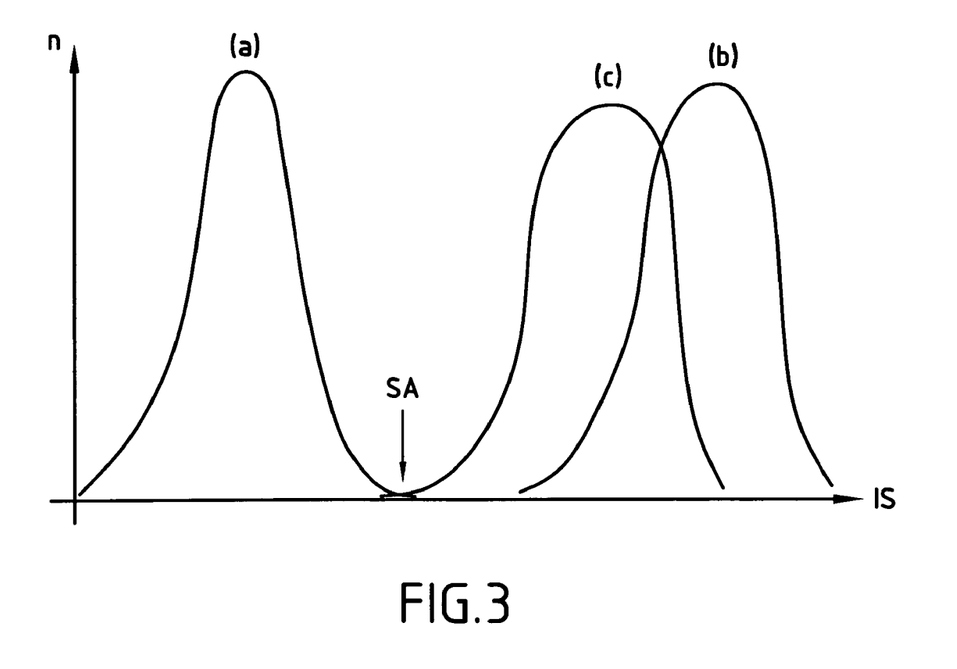
FIG. 3 shows different distribution curves of the number of samples (n) as a function of a similarity index (IS) calculated using the method according to the invention, in graphic form.

FIG. 3 shows the variation of a distribution curve obtained as a function of the deliberate or accidental modification of paper during its life. The curve (a) is the distribution curve of digital signatures obtained from different papers. The curve (b) is the distribution curve of digital signatures obtained with a same paper for different acquisitions.

The digital signatures of a modified paper with different modifications (successive measurements) are shown on the distribution curve (c)=it can be seen that this curve (c) is offset from the distribution curve (a) obtained from the same paper (without modification, successive measurements) and becomes closer to the distribution curve (a) obtained with different papers. The distribution curve (c) also tends to get wider. However, it is clear that the curves (a) and (c) are sufficiently far apart so that a reliable acceptance threshold (SA) can be chosen below which compared papers are considered to be identical (candidate is an authentic), and above which they will be considered as being different (candidate is an impostor). The acceptance threshold is chosen as a function of the use to be made of the papers, determining the target application. The choice of a discriminating acceptance threshold (SA) in the overlap area will necessarily introduce a probability of error about recognition of the paper subjected to the method according to the invention. This threshold is adjusted as a function of the application, choosing whether it is better to reject an authentic paper or to accept an impostor, and a decision confidence index will be issued depending on the selected threshold. This probability of error is extremely small in the case of paper.

The probability of error is less than 1 in $10^{15}$ measurements if the calculated intersection point is chosen as being the level of the acceptance threshold and represented in FIG. 3. In practice, the overlap between the two curves is quasi-nil or extremely law.

EXAMPLE 2

As mentioned above, it is possible to make a frequency passband filtering in FFT (Fast Fourier Transform) on an image of a paper seen in transvision, and that can subsequently be binarised. For well-determined values of this passband filtering, a random binary image will be obtained reflecting the chaotic structure of the paper with a shape similar to a fingerprint. Consequently, algorithm platforms specially created for management of fingerprint identification, for which tests are based on recognition of singularities in the patterns of the fingerprints (minutia (orientations, curvatures, relative position), centre, etc.), have been used.

The advantage of this type of method is that aspects of the generation of digital signatures, the comparison and acceptance or rejection decision for the paper being presented as candidate for the identification, are already present in the said platforms, and possibly combined with the calculation of a confidence index. There are many of the algorithms in question and most of them are very fast in the reference database calculation and interrogation phases. They also include management of interfaces with scanners used for recognition of fingerprints. The algorithms have been used on paper media after minor adaptations.

It is thus possible to perform recognition tasks of the bearer of an identity card at the same time as recognition of the physical medium (paper) used for the identity card, or to grant an access right to a location, a machine, an activity or information if the person is authenticated and if the person has the right fibrous medium (access card).

The invention claimed is:

1. Method for acceptance of a candidate fibrous medium made of paper, cardboard or non-woven as an authentic fibrous medium, comprising the following steps:
   generation of at least one authentic digital signature from a structural characteristic extracted from a reference zone of an authentic fibrous medium, said digital signature representing the fibrous structure of the reference zone, and recording said digital signature on a digital data medium;
   generation of a candidate digital signature from a structural characteristic extracted from a reference zone of a candidate fibrous medium, said digital signature representing the fibrous structure of said reference zone
   comparison of the candidate digital signature with at least one of the previously recorded authentic digital signatures, in order to issue a positive or negative decision about acceptance of the candidate fibrous medium,
characterised in that:
   the structural characteristic of the candidate fibrous medium and the structural characteristic(s) of the authentic fibrous medium(a) are obtained scanning a volume of the medium,
   the comparison is intended to use a statistical method to determine a similarity index between the candidate digital signature and the authentic digital signature, and to compare this similarity index with a given acceptance threshold, the acceptance threshold being chosen so as to enable issuing a positive acceptance decision if the candidate digital signature does not exactly correspond to the authentic digital signature with which it is compared.

2. Acceptance method according to claim 1, characterised in that the acceptance threshold is chosen so as to enable issuing a positive acceptance decision if the candidate fibrous medium is an authentic fibrous medium which reference zone has been modified between the recording step of the authentic digital signature and the generation step of the candidate digital signature.

3. Acceptance method according to claim 1, characterised in that the candidate fibrous medium is an authentic fibrous medium which reference zone has been modified between the recording step of the authentic digital signature and the generation step of the candidate signature, and a positive acceptance decision is issued.

4. Acceptance method according to claim 3, characterised in that the candidate fibrous medium is an authentic fibrous medium which reference zone has been printed, perforated, folded, cut, hand-written, plasticised, covered with a magnetic strip, surface treated, coloured, impregnated, embossed, between the recording step of the authentic digital signature and the generation step of the candidate signature.

5. Acceptance method according to claim 4, characterised in that the candidate fibrous medium is an authentic fibrous medium which reference zone has been printed or perforated.

6. Acceptance method according to claim 1, characterised in that the candidate digital signature is generated submitting the structural characteristic to a complementary digital processing in order to reduce the effect of modifications occurred in the reference zone between the recording step of the authentic digital signature and the generation step of the candidate signature.

7. Acceptance method according to claim 6 characterised in that the digitised structural characteristic is submitted to an erosion processing.

8. Acceptance method according to claim 6, characterised in that the digitised structural characteristic is submitted to a filtering and/or a thresholding processing.

9. Acceptance method according to claim 1, characterised in that the reference zone of the authentic fibrous medium is a whole or part of a virgin/blank fibrous medium, or a virgin/blank part of a fibrous material, ideally a blank/virgin paper sheet.

10. Acceptance method according to claim 1, characterised in that the authentic digital signature and the candidate digital signature represent the unique, complex, chaotic and practically invariable with time structure of their respective reference zone from which they are extracted.

11. Acceptance method according to claim 1, characterised in that the structural characteristic of the authentic fibrous medium(a) and the structural characteristic of the candidate fibrous medium considered are its internal porosity, its formation index in transvision, or the three-dimensional organisation of its fibers network at a microscopic or a macroscopic scale.

12. Acceptance method according to claim 1, characterised in that the structural characteristic of the authentic fibrous medium(a) and the structural characteristic of the candidate fibrous medium are obtained by detecting interaction between the fibrous medium and visible light, by transvision.

13. Acceptance method according to claim 1 characterised in that the structural characteristic of the authentic fibrous medium(a) and the structural characteristic of the candidate fibrous medium considered are submitted to at least an analogue or digital processing chosen among spatial and/or frequency filters (high pass, low pass, passband, etc.) and/or Fourier Transform, and/or so-called wavelet transforms, and/or descriptors, the algorithms that can be used to analyse and/or transform and/or reorganise and/or sort and/or threshold raw data (including signals and images) extracted from the structural characteristic(s), convolution/deconvolution operations, and logical and arithmetic operation between images and/or signals.

14. Acceptance method according to claim 13 characterised in that the structural characteristic of the authentic fibrous medium (a) and the structural characteristic of the candidate fibrous medium considered are submitted to a Fourier transform of an image signal, for instance using a Fast Fourier Transform (FFT) algorithm if the nature of the signal is discrete, or using a Fourier lens if the nature of the signal is optical.

15. Acceptance method according to claim 1 characterised in that the acceptance threshold is chosen so as to enable issuing a positive acceptance decision if the fibrous medium is an authentic fibrous medium, although its digital signature does not exactly correspond to the authentic digital signature of the said authentic medium with which it is compared, due to differences in the conditions under which the digital signature is obtained, and particularly the measurement of the structural characteristic.

16. Acceptance method according to claim 1 characterised in that the candidate digital signature is compared with several authentic digital signatures previously recorded in a database.

17. Acceptance method according to claim 1 characterised in that a positive acceptance decision will be issued accompanied by identification of the authentic digital signature that provides the best similarity index.

18. Acceptance method according to claim 1 characterised in that it also comprises a step to calculate and issue a confidence index for the issued acceptance decision.

19. Acceptance method according to claim 1 characterised in that digital signatures are dynamic and are obtained from fibrous media scrolling relatively to a sensor measuring the structural characteristic.

20. Device adapted for implementing an acceptance method according to one claim 1 that includes:
- means of extracting a structural characteristic from a reference zone on a candidate fibrous medium, by scanning its structure by transvision, representing the fibrous structure of the reference zone, these means comprising a sensor, preferably a CCD or CMOS camera;
- means of digitising and possibly processing/coding the measured structural characteristic into a candidate digital signature;
- means of using a statistical method to calculate a similarity index between the candidate digital signature and an authentic digital signature previously recorded on a digital data medium,
  - means of comparing the similarity index obtained with a given acceptance threshold chosen to enable issuing a positive acceptance decision if the candidate digital signature does not exactly correspond to the authentic digital signature with which it is compared,
- means of issuing a positive or negative decision about acceptance.

21. Device according to claim 20 characterised in that it includes means for erosion and/or filtering and/or thresholding processing.

22. Method for providing secure access control and for giving or not giving an access authorisation, characterised in that it implements the method according to claim 1, the access authorisation only being given if a positive acceptance decision is issued.

23. Method according to claim 22, characterised in that the issue of a positive acceptance decision is accompanied by the issuance of an authorization of entrance in a premise, a machine, a computer, an hotel room.

24. Method according to claim 22, characterised in that the candidate digital signature is compared with several authentic digital signatures, each authentic digital signature having previously been associated, by indexing, with sensitive information recorded in a database, and in that the issue of a positive acceptance decision is accompanied by identification of the authentic digital signature with the best similarity index, and access to the information associated with the said authentic digital signature.

25. Method for providing secure access control and for giving or not giving an access authorisation, characterised in that it implements the method according to claim 2, the access authorisation only being given if a positive acceptance decision is issued.

26. Method for providing secure access control and for giving or not giving an access authorisation, characterised in that it implements the method according to claim 3, the access authorisation only being given if a positive acceptance decision is issued.

27. Method for providing secure access control and for giving or not giving an access authorisation, characterised in that it implements the method according to claim 4, the access authorisation only being given if a positive acceptance decision is issued.

28. Method for providing secure access control and for giving or not giving an access authorisation, characterised in that it implements the method according to claim 5, the access authorisation only being given if a positive acceptance decision is issued.

29. Method for providing secure access control and for giving or not giving an access authorisation, characterised in that it implements the method according to claim 6, the access authorisation only being given if a positive acceptance decision is issued.

30. Method for providing secure access control and for giving or not giving an access authorisation, characterised in that it implements the method according to claim 7, the access authorisation only being given if a positive acceptance decision is issued.

31. Method for providing secure access control and for giving or not giving an access authorisation, characterised in that it implements the method according to claim 8, the access authorisation only being given if a positive acceptance decision is issued.

32. Method for providing secure access control and for giving or not giving an access authorisation, characterised in that it implements the method according to claim 9, the access authorisation only being given if a positive acceptance decision is issued.

33. Method for providing secure access control and for giving or not giving an access authorisation, characterised in that it implements the method according to claim 10, the access authorisation only being given if a positive acceptance decision is issued.

34. Method for providing secure access control and for giving or not giving an access authorisation, characterised in that it implements the method according to claim 11, the access authorisation only being given if a positive acceptance decision is issued.

35. Method for providing secure access control and for giving or not giving an access authorisation, characterised in that it implements the method according to claim 12, the access authorisation only being given if a positive acceptance decision is issued.

36. Method for providing secure access control and for giving or not giving an access authorisation, characterised in that it implements the method according to claim 13, the access authorisation only being given if a positive acceptance decision is issued.

37. Method for providing secure access control and for giving or not giving an access authorisation, characterised in that it implements the method according to claim 14, the access authorisation only being given if a positive acceptance decision is issued.

38. Method for providing secure access control and for giving or not giving an access authorisation, characterised in that it implements the method according to claim 15, the access authorisation only being given if a positive acceptance decision is issued.

39. Method for providing secure access control and for giving or not giving an access authorisation, characterised in that it implements the method according to claim 16, the access authorisation only being given if a positive acceptance decision is issued.

40. Method for providing secure access control and for giving or not giving an access authorisation, characterised in that it implements the method according to claim 17, the access authorisation only being given if a positive acceptance decision is issued.

41. Method for providing secure access control and for giving or not giving an access authorisation, characterised in that it implements the method according to claim 18, the access authorisation only being given if a positive acceptance decision is issued.

42. Method for providing secure access control and for giving or not giving an access authorisation, characterised in that it implements the method according to claim 19, the access authorisation only being given if a positive acceptance decision is issued.

* * * * *